United States Patent [19]

Chu

[11] Patent Number: 5,463,711
[45] Date of Patent: Oct. 31, 1995

[54] SUBMARINE CABLE HAVING A CENTRALLY LOCATED TUBE CONTAINING OPTICAL FIBERS

[75] Inventor: Tek-Che Chu, Morganville, N.J.

[73] Assignee: AT&T IPM Corp., Coral Gables, Fla.

[21] Appl. No.: 282,355

[22] Filed: Jul. 29, 1994

[51] Int. Cl.⁶ ........................................ G02B 6/44
[52] U.S. Cl. .................... 385/101; 385/109; 385/113; 174/70 R
[58] Field of Search ............................ 385/100, 101, 385/109, 113, 114; 174/70 R

[56] References Cited

U.S. PATENT DOCUMENTS

| | | | |
|---|---|---|---|
| 4,230,395 | 10/1980 | Dean et al. | 385/109 |
| 4,522,464 | 6/1985 | Thompson et al. | 385/107 |
| 4,548,664 | 10/1985 | Canivet | 385/109 |
| 4,723,832 | 2/1988 | Okazato et al. | 385/101 |
| 4,775,213 | 10/1988 | Kitayama | 385/109 |
| 4,859,023 | 8/1989 | Eichenbaum et al. | 385/109 |
| 4,915,490 | 4/1990 | Ramsay et al. | 385/100 |
| 4,993,805 | 2/1991 | Abe et al. | 385/109 |
| 5,125,061 | 6/1992 | Marlier et al. | 385/101 |
| 5,150,444 | 9/1992 | Bosisio et al. | 385/109 |
| 5,187,763 | 2/1993 | Tu | 385/100 |
| 5,212,755 | 5/1993 | Holmberg | 385/107 |
| 5,218,658 | 6/1993 | Macleod | 385/107 |
| 5,229,851 | 7/1993 | Rahman | 385/114 |
| 5,285,513 | 2/1994 | Kaufman et al. | 385/109 |
| 5,321,788 | 6/1994 | Arroyo et al. | 385/109 |

*Primary Examiner*—Frank Gonzalez
*Attorney, Agent, or Firm*—Mark K. Young

[57] ABSTRACT

A submarine optical fiber cable adapted for use in shallow-water submarine applications having the economy of non-armored cables with the robustness of armored cables is disclosed. The optical fiber cable comprises a plurality of longitudinally extending strength members arranged in a single layer around a single longitudinally extending central tube in a substantially close fitting manner. Disposed within the central tube is at least one optical fiber. In an illustrative example of the invention, six galvanized steel strength members are arranged in a close fitting manner around a hermetically sealed central steel tube, where the tube and the strength members have substantially identical outside diameters, so as to form a strong and stable shell. Plastic water-blocking material is disposed in the interstices between the strength members and the tube. Insulated conductors are disposed in grooves formed between adjacent strength members. An longitudinally extending annular plastic jacket is disposed about the strength members.

38 Claims, 1 Drawing Sheet

SUBMARINE CABLE HAVING A CENTRALLY LOCATED TUBE CONTAINING OPTICAL FIBERS

TECHNICAL FIELD

This invention relates to optical fiber cables. More particularly, this invention relates to optical fiber cables adapted for shallow-water submarine applications.

BACKGROUND OF THE INVENTION

Optical fibers are in widespread use today as the information-carrying component of communications cables because of their large bandwidth capabilities and small size. However, they are mechanically fragile, exhibiting undesirable fracture under some tensile loads and degraded light transmission under some radial compressive loads due to a phenomena known as microbending loss. Optical fibers may be subjected to tensile loading during deployment and recovery operations of optical fiber cables. Radial compressive loads are typically exerted on the optical fibers as a result of hydrostatic water pressure in submarine applications. Radial compressive loads may also result from crush and impact from trawling, anchoring, and other ship-related activities.

In many typical submarine optical fiber cables, a supporting metallic structure, called "armor," is employed to protect the fragile optical fibers from excessive tensile and radial forces. Many armor designs encompass numerous steel wires that are wound, in some instances in multiple layers, around a core carrying the optical fibers. Armored cables are therefore generally much more expensive than typical non-armored cables. With suitable armor, optical fiber cables are well-suited for many submarine applications. However, these traditional armored optical fiber cable designs have not proven to be cost effective for use in shallow-water coastal applications. While some success has been achieved with buried non-armored cable in shallow-water applications, such efforts have not proven to be completely satisfactory because non-armored cables often lack abrasion resistance and sufficient tensile strength to survive recovery operations. As a result, many shallow-water systems have been deployed using a high-percentage of expensive armored cable in order to gain the required protection from ship-related damage.

SUMMARY OF THE INVENTION

An optical fiber cable adapted for use in shallow-water submarine applications having the economy of non-armored cables with the robustness of armored cables is herein achieved, in accordance with the invention, by an optical fiber cable comprising a plurality of longitudinally extending strength members arranged in a single layer around a single longitudinally extending central tube in a substantially close fitting manner. Disposed within the central tube is at least one optical fiber.

In an illustrative embodiment of the invention, six galvanized steel strength members are arranged in a substantially close fitting manner around a hermetically sealed central steel tube containing at least one optical fiber, where the tube and the strength members have substantially identical outside diameters, so as to form a single layered shell. Plastic water-blocking material is disposed in the interstices between the strength members and the tube. Insulated conductors are disposed in grooves formed between adjacent strength members. A longitudinally extending annular plastic jacket is disposed about the strength members.

By arranging the strength members around the central tube in a substantially close fitting manner, a strong stable shell is obtained that protects the optical fibers against abrasion, crush, impact and hydrostatic pressure. In addition, the strength members give the optical fiber cable sufficient tensile strength to withstand shallow-water deployment and recovery.

The discussion in this Summary of the Invention and the following Brief Description of the Drawing, Detailed Description, and drawing only deals with examples of this invention and is not to be considered in any way a limitation on the scope of the exclusionary rights conferred by a patent which may issue from this application. The scope of such exclusionary rights is set forth in the claims at the end of this application.

BRIEF DESCRIPTION OF THE DRAWING

The sole FIGURE is a cross-sectional view of an optical fiber cable, in accordance with the invention.

DETAILED DESCRIPTION

Figure 1:
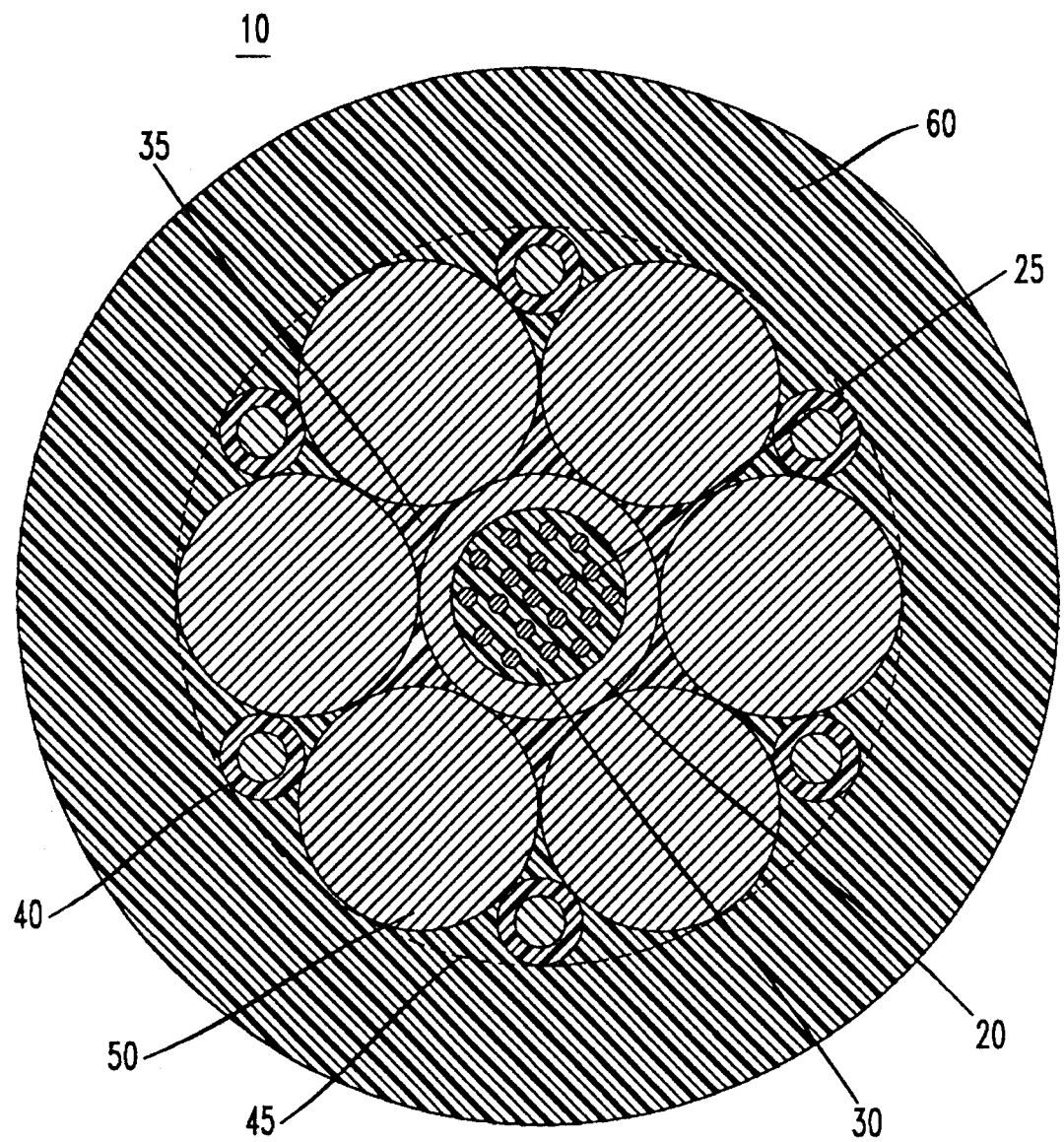

The FIGURE illustrates an optical fiber cable 10 in accordance with the invention. Optical fiber cable 10 will be described with respect to specific embodiments such as overall size, dimensions and materials used to fabricate an submarine optical fiber cable which comes within the scope of the invention. However, the invention is not limited to the specific dimensions or materials used in the following description, nor is it limited solely to submarine applications. The described optical fiber cable is useful in any application which requires high tensile strength, and high resistance to crushing, impact, and abrasion in a cost effective manner.

Optical fiber cable 10 includes a single central tube 20. Central tube 20 can be, for example, plastic, metal-coated plastic, metal foil-covered plastic, or metal. If metal, then seamed tubing, extruded seamless tubing, and combinations thereof, may be used, preferably being made from either steel, aluminum, or copper. Central tube 20 may be formed, for example, from welded hemicylindrical sections or preferably from continuously seam-welded formed sheet or tape. In this illustrative embodiment, central tube 20 is a steel tube which is hermetically sealed against moisture. As will be appreciated by those skilled in the art, the combination of moisture and mechanical stresses on fibers has been found to quickly lead to structural failure. To avoid such problems, steel sheet or tape is formed into the shape of a tube during the fabrication of central tube 20 and longitudinally welded along the length of the seam to hermetically seal the contents of the tube. Such welding may be accomplished, for example, by laser, arc-welding under an inert gas, plasma-arc, or by any other appropriate method. If central tube 20 is formed from aluminum then the welded seam may be formed using a solid-phase or other cold welding process. For further moisture protection, central tube 20 can be coated with plastic or galvanized.

Disposed within central tube 20 is at least one optical fiber 25. Optical fibers 25 may be arranged within central tube 20 in any number of convenient ways, for example, loose as illustrated, stranded in bundles, or in ribbons. Optical fibers 25 may be optionally surrounded by and coated with an insulating material 30, for example thermoplastic or thermosetting elastomers and the like. One commercially available example of an appropriate insulating material is supplied under the designation "HYTREL" by the DuPont Corporation. The insulating material may also be a hydrophobic elastomeric water-blocking material to provide additional moisture protection to optical fibers 25, particularly against longitudinal water ingress. Insulating material 30 may partially or, as illustrated in the FIGURE, completely fill central tube 20.

Six cylindrically-shaped strength members 50 having high tensile strength are disposed around the central tube 20. Suitable materials include, for example, steel, aluminum and copper. Preferably, strength members 50 are made of steel, for example, galvanized improved plow steel having a nominal tensile strength of 200 kpsi. Strength members 50 are wound, preferably in a helical lay, about central tube 20 in a single layer to form a shell 45. Strength members 50 may contact each other and central tube 20 in a close-fitting manner as illustrated in the FIGURE, or have small spaces in between. The shell 45 formed by strength members 50 is a particularly strong and stable arrangement that isolates optical fibers 25 from high radial compressive loading. This strength and stability is enhanced if the strength members and the central tube 20 all have substantially identical outside diameters and are arranged in a close fitting manner as described above and as shown in the FIGURE The close fitting arrangement advantageously allows radially directed forces to be uniformly distributed and borne by the strength members 50 which form shell 45. The thickness of central tube 20 may also be selected to further enhance the strength of optical fiber cable 10. While other than six strength members may also be used without departing from the spirit of the invention, six is the preferable number of strength members because a greater or lesser number reduces the strength and stability of the optical fiber cable. Strength members 50 are sized to provide optical fiber cable 10 with sufficient tensile strength to limit cable and optical fiber elongation during deployment and recovery operations. Strength members 50 also help to give optical fiber cable 10 considerable abrasion resistance.

The interstices formed between strength members 50 and central tube 20 may be filled with a hydrophobic elastomeric water-blocking material 35 of any type known in the art, for example, polyurethane resin. Such a water-blocking material seals optical fiber cable 10 against the longitudinal propagation of water that could result in the event that the immersed cable becomes damaged. However, as the central tube 20 is hermetically sealed against moisture as described above, the use of such water-blocking material should be considered as an optional way of providing extra moisture resistance. Water-blocking material 35 may also advantageously help to reduce corrosion of strength members 50 and central tube 20.

Disposed within the grooves formed between adjacent strength members 50 are a plurality of conductors 40. Conductors 40 are wound with the same helical lay angle as used with strength members 50 when wound about central tube 20, as described above. Conductors 40 may be, for example, any electrically conducting material having low resistance such as copper or aluminum. Conductors 40 are preferably insulated with plastic in any conventional manner known in the art. The size of conductors 40 is selected so that they have a relatively small diameter in comparison to that of strength members 50. This relatively small size allows conductors 40 to be nestled well down into the grooves between strength members 50. Thus, it is desirable for the diameter of conductors 40 to be so determined that they fit within the total outer diameter of shell 45. This total outer diameter of shell 45 is indicated by the dashed circle in the FIGURE The nestling of conductors 40 well down in the grooves between strength members advantageously allows a considerable measure of protection to be afforded to the conductors by the strength members 50. Conductors 40 are useful as signal paths which may be used, for example, for telemetry, cable fault location, and other applications requiring moderate voltage.

An annular jacket 60 is disposed around strength members and conductors 40. Jacket 60 may be, for example, a thermoplastic material such as medium or high-density polyethylene and the like. Such materials resist abrasion and corrosion and provide a suitable finish for cable handling and visibility. The thickness of jacket 60 is a function of the desired degree of protection.

Without in any way affecting the generality of the foregoing description, Table 1 below presents typical sizes of the various elements of optical fiber cable 10.

TABLE 1

| | |
|---|---|
| Inside diameter of central tube | 0.16in. |
| Outside diameter of central tube | 0.20in. |
| Outside diameter of strength member | 0.20in. |
| Outside diameter of conductors | 0.075in. |
| Outer diameter of strength member shell | 0.60in. |
| Thickness of plastic jacket | 0.20in. |
| Outer diameter of optical fiber cable | 1.00in. |

As a result of the dimensions listed above, an optical fiber cable capable of bearing a tensile load of approximately 40,000 lbs is obtained. That is, the optical fiber cable of the present invention has sufficient performance for use in shallow-water applications.

In the foregoing, an illustrative arrangement of the invention has been described. Many variations and modifications will now occur to those skilled in the art. It is accordingly desired that the scope the appended claims not be limited to the specific disclosure herein contained.

I claim:
1. An optical fiber cable, comprising:
   a longitudinally extending central tube;
   six cylindrically-shaped longitudinally extending steel strength members helically wound around said longitudinally extending central tube in a substantially close fitting manner, wherein said longitudinally extending central tube and each of said cylindrically-shaped longitudinally extending steel strength members have substantially identical outside diameters, so as to form a single layered shell;
   at least one optical fiber disposed within said longitudinally extending central tube; and
   a water-blocking material disposed in interstices between said cylindrically-shaped longitudinally extending strength members and said longitudinally extending central tube.

2. The optical fiber cable of claim 1 wherein said longitudinally extending central tube is hermetically sealed.

3. The optical fiber cable of claim 1 wherein each of said cylindrically-shaped longitudinally extending strength members comprises a metal selected from the group consisting of steel, copper, or aluminum.

4. The optical fiber cable of claim 1 wherein each of said cylindrically-shaped longitudinally extending strength members comprises galvanized improved plow steel.

5. The optical fiber cable of claim 1 further including an elastomeric material contacting and surrounding said at least one optical fiber disposed within said longitudinally central extending tube.

6. The optical fiber cable of claim 5 wherein said elastomeric material substantially fills said longitudinally extending central tube.

7. The optical fiber cable of claim 1 further including an annular jacket disposed around said cylindrically-shaped longitudinally extending strength members.

8. The optical fiber cable of claim 7 wherein said annular jacket comprises a material selected from the group consisting of medium density polyethylene, high density polyethylene, or thermosetting resins.

9. The optical fiber cable of claim 1 further including a plurality of electrical conductors disposed in grooves between adjacent ones of said cylindrically-shaped longitudinally extending strength members.

10. The optical fiber cable of claim 9 wherein said conductors are wound in a helical lay about said cylindrically-shaped longitudinally extending strength members.

11. The optical fiber cable of claim 10 wherein said electrical conductors are insulated.

12. The optical fiber cable of claim 1 wherein said at least one optical fiber is disposed within said longitudinally extending central tube in a configuration selected from the group consisting of bundles or ribbons.

13. The optical fiber cable of claim 1 wherein said at least one optical fiber is disposed within said longitudinally extending central tube in a loose arrangement.

14. An optical fiber cable, comprising:

a longitudinally extending central tube;

six cylindrically-shaped longitudinally extending steel strength members helically wound around said longitudinally extending central tube in a substantially close fitting manner, wherein said longitudinally extending central tube and each of said cylindrically-shaped longitudinally extending steel strength members have substantially identical outside diameters, so as to form a single layered shell;

at least one optical fiber disposed within said longitudinally extending central tube; and a plurality of electrical conductors disposed in grooves between adjacent ones of said cylindrically-shaped longitudinally extending strength members.

15. The optical fiber of claim 14, wherein said electrical conductors are insulated.

16. The optical fiber cable of claim 14 wherein said longitudinally extending central tube is hermetically sealed.

17. The optical fiber cable of claim 14 wherein each of said cylindrically-shaped longitudinally extending strength members comprises a metal selected from the group consisting of steel, copper, or aluminum.

18. The optical fiber cable of claim 14 wherein each of said cylindrically-shaped longitudinally extending strength members comprises galvanized improved plow steel.

19. The optical fiber cable of claim 14 further including an elastomeric material contacting and surrounding said at least one optical fiber disposed within said longitudinally central extending tube.

20. The optical fiber cable of claim 19 wherein said elastomeric material substantially fills said longitudinally extending central tube.

21. The optical fiber cable of claim 14 further including an annular jacket disposed around said cylindrically-shaped longitudinally extending strength members.

22. The optical fiber cable of claim 21 wherein said annular jacket comprises a material selected from the group consisting of medium density polyethylene, high density polyethylene, or thermosetting resins.

23. The optical fiber cable of claim 14 wherein said conductors are wound in a helical lay about said cylindrically-shaped longitudinally extending strength members.

24. The optical fiber cable of claim 14 wherein said at least one optical fiber is disposed within said longitudinally extending central tube in a configuration selected from the group consisting of bundles or ribbons.

25. The optical fiber cable of claim 14 wherein said at least one optical fiber is disposed within said longitudinally extending central tube in a loose arrangement.

26. The optical fiber cable of claim 14 further including a water-blocking material disposed in interstices between said cylindrically-shaped longitudinally extending strength members and said longitudinally extending central tube.

27. An optical fiber cable, comprising;

a longitudinally extending central tube;

six cylindrically-shaped longitudinally extending steel strength members helically wound around said longitudinally extending central tube in a substantially close fitting manner, wherein said longitudinally extending central tube and each of said cylindrically-shaped longitudinally extending steel strength members have substantially identical outside diameters, so as to form a single layered shell; and at least one optical fiber disposed within said longitudinally extending central tube;

wherein said at least one optical fiber is disposed within said longitudinally extending central tube in a loose arrangement.

28. The optical fiber cable of claim 27 wherein said longitudinally extending central tube is hermetically sealed.

29. The optical fiber cable of claim 27 wherein each of said cylindrically-shaped longitudinally extending strength members comprises a metal selected from the group consisting of steel, copper, or aluminum.

30. The optical fiber cable of claim 27 wherein each of said cylindrically-shaped longitudinally extending strength members comprises galvanized improved plow steel.

31. The optical fiber cable of claim 27 further including an elastomeric material contacting and surrounding said at least one optical fiber disposed within said longitudinally central extending tube.

32. The optical fiber cable of claim 31 wherein said elastomeric material substantially fills said longitudinally extending central tube.

33. The optical fiber cable of claim 27 further including an annular jacket disposed around said cylindrically-shaped longitudinally extending strength members.

34. The optical fiber cable of claim 33 wherein said annular jacket comprises a material selected from the group consisting of medium density polyethylene, high density polyethylene, or thermosetting resins.

35. The optical fiber cable of claim 27 further including a water-blocking material disposed in interstices between said cylindrically-shaped longitudinally extending strength members and said longitudinally extending central tube.

36. The optical fiber cable of claim 27 further including a plurality of electrical conductors disposed in grooves between adjacent ones of said cylindrically-shaped longitudinally extending strength members.

37. The optical fiber cable of claim 36 wherein said conductors are wound in a helical lay about said cylindrically-shaped longitudinally extending strength members.

38. The optical fiber cable of claim 37 wherein said electrical conductors are insulated.

* * * * *